S. J. BENS.
LINK BELT OR CHAIN.
APPLICATION FILED FEB. 17, 1916. RENEWED JUNE 15, 1917.
1,259,716.
Patented Mar. 19, 1918.
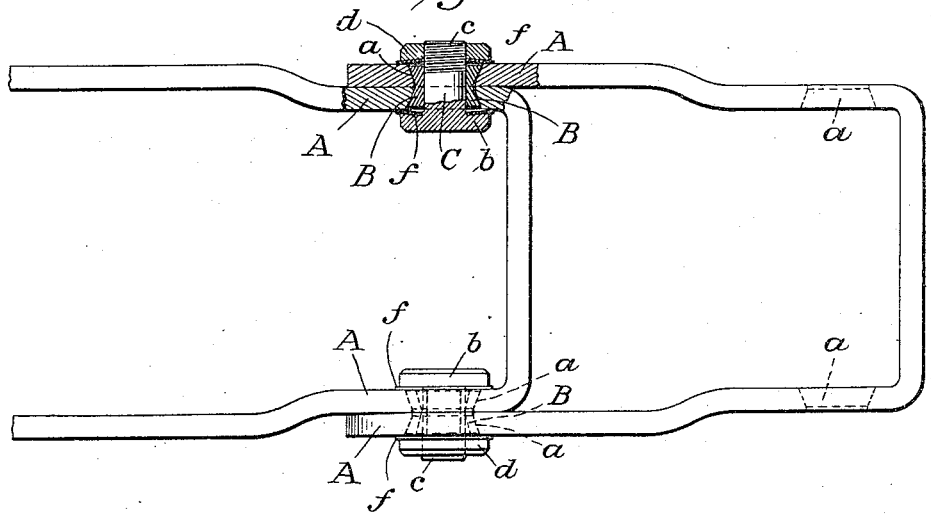
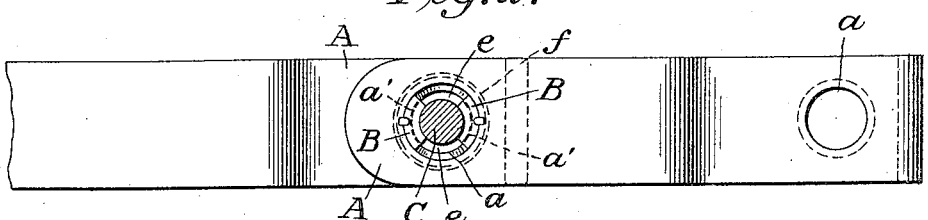
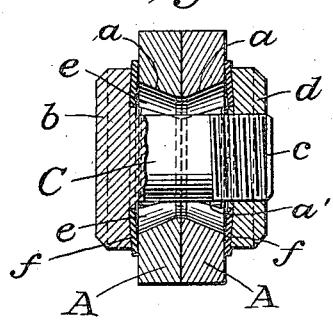
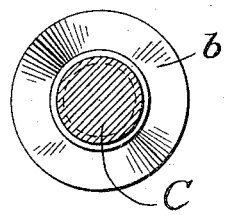
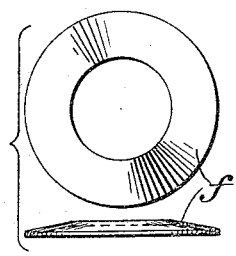
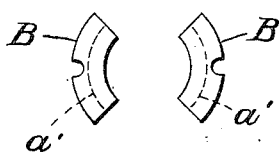
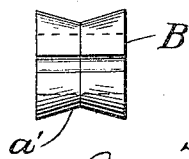
Inventor:
Samuel J. Bens,

UNITED STATES PATENT OFFICE.

SAMUEL J. BENS, OF BERKELEY, CALIFORNIA.

LINK BELT OR CHAIN.

1,259,716.  Specification of Letters Patent.  Patented Mar. 19, 1918.

Application filed February 17, 1916, Serial No. 78,912. Renewed June 15, 1917. Serial No. 175,045.

*To all whom it may concern:*

Be it known that I, SAMUEL J. BENS, a citizen of the United States, residing at Berkeley, California, have invented certain new and useful Improvements in Link Belts or Chains, of which the following is a specification.

My present invention constitutes an improvement on what is disclosed in an application filed by me on the 10th day of March, 1915, #13,463, for an improvement in link belts or chains.

In this application it was desirable to form a flush joint and at the same time make the parts very simple and strong, the invention being particularly adapted to be utilized in connection with an endless chain saw.

In carrying out my invention as described therein I utilized in uniting the overlapping links of a belt or chain, a pair of arc-shaped bushings having channeled peripheries engaging correspondingly formed openings in the links, a pin or rivet preventing displacement of the arc-shaped bushings from said openings.

I now find that there are many other situations in carrier belts or indeed in all forms of link belts or chains to which I can apply my invention a step beyond what is disclosed in the application above referred to and thus utilize the invention in situations where a flush joint is not important and in heavier work than that specifically referred to in the said application. This extension of the invention consists broadly in heading the rivet and utilizing a nut upon the opposite end so as to cover the openings between the arc-shaped bushings and the space in which they are located and utilize these spaces or openings to contain a lubricant.

In the accompanying drawing,

Figure 1 shows the invention as applied to a well-known form of conveyer, one side being in section and the other side in plan.

Fig. 2 shows a view of the joint with the head of the rivet removed.

Fig. 3 is a vertical section through the link.

Fig. 4 is a detail section through the rivet showing the head thereof.

Fig. 5 is a separate view of the washer.

Figs. 6 and 7 show separate views of the bushings.

A, A show the overlapping parts of a conveyer with alining openings $a$, these openings being reversely flared, as in the application above referred to, in opposite directions, and within these openings I place a pair of bushings B of arc-shape, as shown in Figs. 6 and 7 and as in my former application. The bushings have their outer peripheries provided with grooves or channels $a'$ of V-shape in cross section or concaved to correspond to the walls of the alining openings in the overlapping links. In order to hold these bushings in place I use a pin or rivet C, which has a head $b$ and a threaded end $c$ with a nut $d$ thereon or this end may be riveted or upset as may be desired. In the spaces between the pin or rivet, the bushings and the walls of the opening, as shown at $e$ in Fig. 2, I place a lubricant and it will be seen that when the parts are drawn together as by the screwing up of the nut $d$, the lubricant is prevented from escaping and I secure all the remarkable advantages of the bushings of my former application with the added advantage of a lubricated joint.

In order to make this joint dust-proof and to still further prevent any liability of the escape of the lubricant I dish or concave the under faces of the pin or rivet head and nut and insert spring washers $f$, which are held in place upon the head and nut and extend out beyond the walls thereof at an inclination so that when the parts are drawn together, as by tightening up the nut, the washers are pressed in close contact with the surface of the links, preventing ingress of dirt and egress of oil.

I do not limit myself to any particular application of the invention, as it may be found useful in any form of link belt or chain, where simplicity of construction and minimum wear is of importance.

What I claim is:—

1. In a link belt or chain joint, a pair of overlapping links having alining openings, a pair of arc-shaped bushings within the openings and having a channeled periphery coinciding with the inner periphery of the alining openings, a pivot member between the arc-shaped bushings, the pivot member being headed at its ends to close the spaces between the bushings which spaces are adapted to be filled with lubricant, substantially as described.

2. In a link belt or chain joint, a pair of links, arc-shaped bushings engaging alining openings within said links, the periphery of the bushings being channeled to coincide with the walls of the openings, a pivot member for holding the bushings in place, said pivot member being headed and washers having their outer edges bearing on the links to form a dust-proof connection, substantially as described.

In testimony whereof, I affix my signature in presence of two witnesses.

SAMUEL J. BENS.

Witnesses:
F. L. WINDLITOR,
BENNET S. JONES.

Copies of this patent may be obtained for five cents each, by addressing the "Commissioner of Patents, Washington, D. C."